(12) United States Patent
Simmons

(10) Patent No.: US 7,441,692 B2
(45) Date of Patent: Oct. 28, 2008

(54) METHOD AND STRUCTURE FOR I-BEAM END GEOMETRY STABILIZATION

(76) Inventor: Robert J. Simmons, 27308 Fairview Ave., Hayward, CA (US) 94542

( * ) Notice: Subject to any disclaimer, the term of this patent is extended or adjusted under 35 U.S.C. 154(b) by 612 days.

(21) Appl. No.: 10/935,764

(22) Filed: Sep. 8, 2004

(65) Prior Publication Data
US 2006/0059851 A1   Mar. 23, 2006

(51) Int. Cl.
    B23K 31/00   (2006.01)
(52) U.S. Cl. .................. 228/212; 228/44.3; 52/223.8
(58) Field of Classification Search ............ 228/212, 228/213, 44.3, 47.1, 49.1, 49.3, 49.4; 52/223.8, 52/433, 223.9, 223.11, 426.2, 726.2, 729.1, 52/443
    See application file for complete search history.

(56) References Cited
U.S. PATENT DOCUMENTS

| | | | | |
|---|---|---|---|---|
| 1,911,413 A | * | 5/1933 | Wait | 52/729.1 |
| 2,019,684 A | | 11/1935 | Leake | |
| 2,172,806 A | * | 9/1939 | Probeck | 29/897.35 |
| 2,376,574 A | * | 5/1945 | Collins | 228/173.1 |
| 2,959,256 A | * | 11/1960 | Deam | 52/236.1 |
| 3,126,709 A | * | 3/1964 | Dougherty | 405/251 |
| 4,433,524 A | * | 2/1984 | Matson | 52/665 |
| 4,626,148 A | | 12/1986 | Pringle | |
| 5,601,736 A | * | 2/1997 | Saitoh et al. | 219/121.64 |
| 5,688,426 A | * | 11/1997 | Kirkwood et al. | 219/633 |
| 6,237,303 B1 | * | 5/2001 | Allen et al. | 52/729.1 |
| 6,520,706 B1 | * | 2/2003 | McKague et al. | 403/265 |
| 6,823,707 B2 | * | 11/2004 | Andras et al. | 72/389.1 |
| 2005/0045693 A1 | * | 3/2005 | Buchheit et al. | 228/112.1 |
| 2005/0055954 A1 | | 3/2005 | Simmons | |

* cited by examiner

Primary Examiner—Kevin P Kerns
Assistant Examiner—Michael Aboagye
(74) Attorney, Agent, or Firm—Jon M. Dickinson, PC; Robert D. Varitz, PC

(57) ABSTRACT

A method for stabilizing, in correctness, the transverse cross section of the end of an elongate structural beam during weld attachment to that end of a beam-end mounting component. This method includes the steps of (a) configurationally correcting and capturing the end transverse footprint of such a beam with an external structure to lock that footprint against subsequent configuration change, and (b), while performing that capturing step, weld-attaching the beam's end transverse footprint to the mentioned beam-end mounting component.

11 Claims, 1 Drawing Sheet

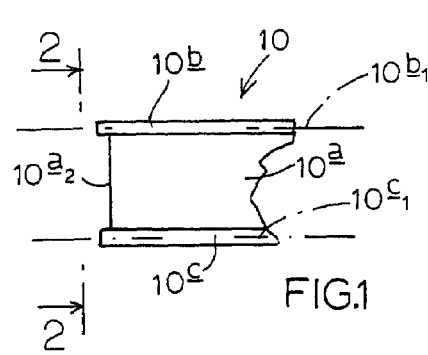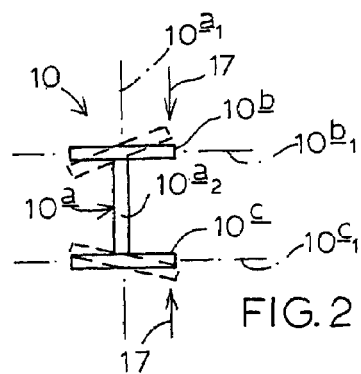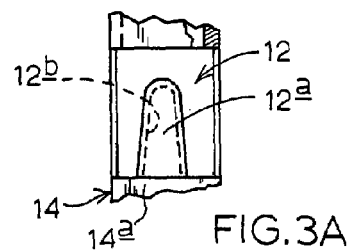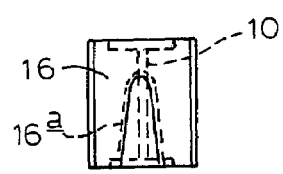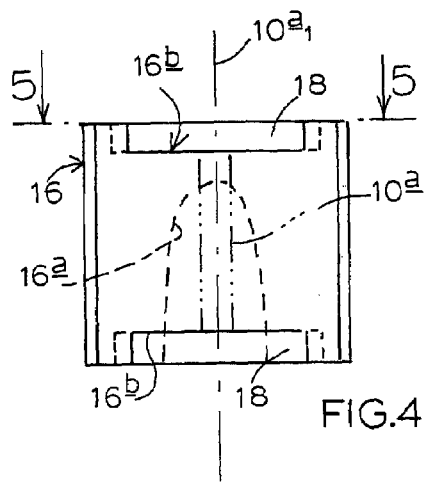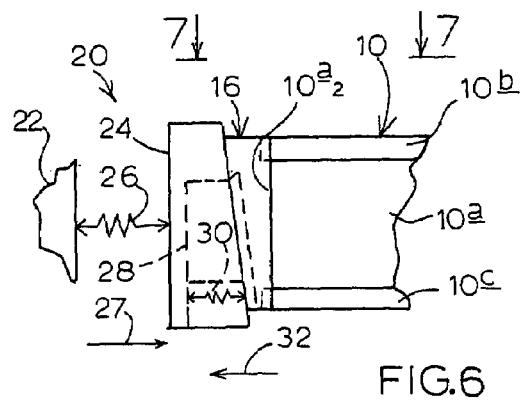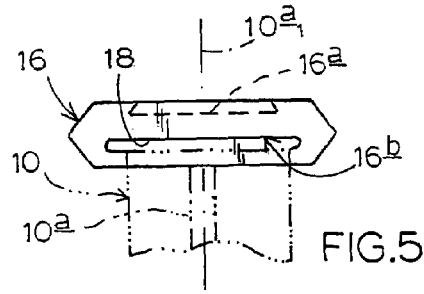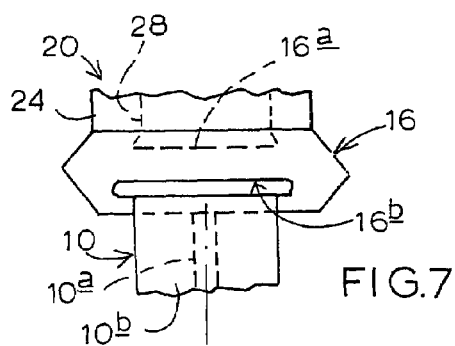

METHOD AND STRUCTURE FOR I-BEAM END GEOMETRY STABILIZATION

BACKGROUND AND SUMMARY OF THE INVENTION

This invention pertains to a method for stabilizing, the transverse (across the long axis) cross-sectional footprint of the end of a structural I-beam to which an end mounting component is to be precision oriented and welded in preparation for attaching the beam to the side of a column in a precision building frame structure.

For the purpose of illustration, a preferred and best-mode manner of practicing the invention, referred to also as a method associated with the attachment of a beam to a column utilizing a beam-end mounting component, is described in conjunction with a particular, collar-based, column/beam mounting, or interconnect, system with respect to which practice of this invention has been found to offer particular utility. This system is described in a prior-filed, currently pending U.S. Patent Application identified as Ser. No. 09/943,711, filed on Aug. 30, 2001 for "Moment-Resistant Building Frame Structure Componentry and Method", now U.S. Pat. No. 6,837,016 B2, granted Jan. 4, 2005. For background purposes only herein, the disclosure of this patent application is hereby incorporated herein by reference. Component parts employed in this prior-application-disclosed interconnection system are illustrated and described herein to the extent useful in explaining the substance, and the principles of operation, of the present invention.

It is typical that horizontal beams employed in a structural, plural-story building frame are formed with an I-beam transverse cross-sectional footprint, or configuration. The present invention, which, as will become apparent, can be invoked with any beam "cross section", is specifically illustrated herein in the context of an I-beam configuration with respect to which it has been found to offer particular utility. Thus, specific reference herein to an I-beam should be understood to be reference also to other beam cross sectional configurations with respect to which implementation of the present invention may have utility.

It is also typical that, during the initial rolling or fabrication of a beam, such as an I-beam, a certain amount of transverse cross-sectional configuration distortion, or deformation, can occur as the beam cools from the heated rolling or fabrication process. In the case of an I-beam, this deformation usually involves angulation of one or both flanges out of a designed and intended condition of right-angularity, or parallel planarity, relative to the beam's central web. Such deformation is, for a number of reasons, undesirable. One important reason involves the issue of precision preparing of a beam for installation in a close-tolerance, precision building frame. A warped-cross-section beam can, under such a circumstance, create a problem. It is this kind of deformation which the method of the present invention successfully and easily addresses, thus to "clear the way" for successful and unproblematic use of otherwise ordinarily rolled or fabricated beam in a precision-installation mode of building frame assembly.

According to the preferred and best-mode manner of practicing the invention, the proposed beam-end "footprint correctness" stabilization, with respect to each beam end, includes the steps of (a) configurationally correcting and capturing the end transverse footprint of such a beam with an external structure to lock that footprint against subsequent configuration change, and (b) while so capturing, weld-attaching that end transverse footprint to a beam-end mounting component.

Another manner of expressing the method of this invention is to describe it as including the steps of (a) assuring the presence, at the mentioned beam end, of a configurationally correct transverse cross section with a defined male attaching portion, (b) forming, in a beam-end mounting component's attaching side, at least a partial, matching-cross-section, female reception structure, or receptor, which is adapted snuggly to receive, complementarily, the correctly cross-sectioned male attaching portion of the mentioned beam end, (c) inserting the beam-end male attaching portion into the beam-end mounting component's female reception structure to produce a weld-poised, captured condition between the beam end and the beam-end mounting component, and (d) while holding that weld-poised condition, producing a weld between the beam end and the beam-end mounting component.

In the practice of the invention which is specifically disclosed herein, formation of the above-mentioned female reception structure, which can be thought of as being a kind of receptor pocket, takes place on one side (called the attaching side) of a beam-end component of the type employed in the interconnection structure described in the referenced, prior-filed patent application.

The various features and advantages of the invention will become more fully apparent as the detailed description which now follows is read in conjunction with the accompanying drawings.

DESCRIPTION OF THE DRAWINGS

FIG. 1 is a fragmentary side elevation of an end of an I-beam which is conventional except for the presence of a certain pre-weld, beam end preparation made as a part of practice of the present invention. No beam distortion is shown in this figure.

FIG. 2 is a transverse cross-sectional view of the I-beam of FIG. 1, taken generally along the line 2-2 in FIG. 1. Solid lines in FIG. 2 show the proper design configuration intended for the transverse cross-sectional footprint of this beam, and dashed lines are employed, in an exaggerated manner, to illustrate a condition of possible initial rolling- or fabrication-created distortion/deformation which is corrected and managed in accordance with practice of the present invention.

FIGS. 3A and 3B present illustrations of the "mating faces", or sides, of precision column-side and beam-end collar-form interconnect components constructed in accordance with the disclosure of the above-referenced, prior-filed patent application, and provided herein to give an illustration of a particular setting wherein practice of the present invention offers special utility.

FIG. 4 is a view presented on a larger scale than that employed in FIG. 3B showing the prepared face (opposite the face shown in FIG. 3B) of a beam-end mounting component (the "attaching side") which has been readied to be welded to the end of a beam, such as that of the beam shown in FIGS. 1 and 2.

FIG. 5 is a view taken generally along the line 5-5 in FIG. 4.

In FIGS. 4 and 5, dash-triple-dot lines show an I-beam end joined to the illustrated beam-end mounting component.

FIG. 6 is a fragmentary and somewhat schematic side view illustrating practice of the present invention utilizing a jig which is described hereinbelow.

FIG. 7 is a view taken generally along the line 7-7 in FIG. 6, presented on a slightly larger scale than that employed in FIG. 6, and rotated 90° clockwise.

DETAILED DESCRIPTION OF THE INVENTION

As was mentioned earlier, the preferred and best-mode manner of practicing the present invention are described and illustrated herein with respect to a generally conventional, elongate I-beam, slightly modified at its opposite ends as will shortly be explained. It should be understood however, that while the description of the invention herein is presented in the context of an I-beam, and as was stated earlier herein, other types of beams may also easily be accommodated.

In FIGS. 1 and 2, an end of a "nearly" conventional, elongate I-beam is shown generally at 10. Use of the term "nearly" will shortly be explained. This beam includes a central web 10a, and substantially parallel planar upper and lower flanges 10b, 10c, respectively. Web 10a and flanges 10b, 10c are substantially planar, with the plane of web 10a being shown at $10a_1$, and the planes of flanges 10b, 10c being shown at $10b_1$, and $10c_1$, respectively. By intended design, plane $10a_1$ intersects planes $10b_1$, $10c_1$ at right angles.

In solid lines in FIG. 2, the intended design (correct) transverse cross-sectional configuration/footprint of beam 10 is shown. In dashed lines in FIG. 2, this configuration is seen to be distorted, or deformed, angularly in an exaggerated manner. This distortion generally illustrates the kinds of undesirable fabrication deformation which can exist in a conventionally acquired structural I-beam.

FIGS. 1 and 2 show, at $10a_2$, that, with respect to beam 10, and in a step of the invention referred to herein both as an "assuring" step and as a pre-weld preparation step, an axially recessed region of central web 10a has been created. This recessed region, along with the resulting, axially "projecting" portions of the flanges, constitute what is referred to herein as a defined male attaching portion in the illustrated end of beam 10. As will become apparent, in another modified way of practicing the present invention, the step of assuring the presence of an appropriate beam-end male attaching portion can be accomplished without creating the mentioned web recessed region. The opposite end (not shown) of beam 10 is prepared in the same fashion. It is because of the "preparation" thus shown at $10a_2$ that the term "nearly" was employed above this text.

Turning attention to FIGS. 3A and 3B, shown in FIG. 3A is a beam-accommodating attaching component 12 which is illustrated in this figure suitably attached (as by welding) to a face 14a in a hollow and tubular, square cross section beam 14. Formed on that face of component 12 which faces the viewer in FIG. 3A is a male cleat 12a which projects toward the viewer, and which includes upper and lateral perimeter under-beveling, as indicated by a dashed line 12b.

Shown at 16 in FIG. 3B is a complementary beam-end mounting component which is to be secured, in accordance with practice of the present invention, to an end of a beam, such as to the end of beam 10 shown in FIGS. 1 and 2. Component 16, in the face of that component which confronts the viewer in FIG. 3B, includes a formed female recess 16a which is adapted, fully complementarily, to receive previously mentioned cleat 12a. It is through complementary interconnection between components 12, 16 that an end of a beam will be attached to a column, such as column 14.

Shown in dashed lines at 10 in FIG. 3B is the transverse cross-section, or footprint, of beam 10 illustrated as if attached to the far side of component 16 in FIG. 3B, with the long axis of the beam extending away from the viewer and generally normal to the plane of FIG. 3B. With component 16 attached to such a beam end, as will shortly be described, the associated beam will ultimately be attached to a column, such as column 14, through inter-engagement between component 16 and a component 12 (see FIG. 3A).

Turning attention now to FIGS. 4 and 5, here we see illustrated in somewhat greater detail beam-end mounting component 16, this time with (in FIG. 4) the side of that component to which a beam is to be attached facing the viewer. This side is the one that was referred to immediately above as the non-visible, or far, side of component 16 as such was pictured in FIG. 3B. In FIGS. 4 and 5 beam 10, with respect to its attached relationship to component 16, is generally pictured in dash-triple-dot lines.

Formed appropriately on and within that face of component 16 which faces the viewer in FIG. 4, and which faces downwardly in FIG. 5, are two removed-material regions 16b. Regions 16b are referred to herein collectively as female reception structure, and individually both as female attaching portions, and as female flange-structure reception zones. These regions have the shapes clearly shown for them in these two figures, and as can be seen, regions 16b define appropriate reception shelves, or seats, intended to receive the projecting ends of flanges 10b, 10c in beam 10, with web 10a directly butting against component 16 along the facial region of that component which lies between regions 16b.

Another approach to creating a female receptive structure might be to create slotted areas in the appropriate face of a beam end component which accommodate both the flanges adjacent a beam end, and the central web end extending between these flanges.

Prior to complementary fitment of a prepared beam end and a prepared beam-end mounting component, and in accordance with practice of the present invention, an "assurance" is made appropriately to correct any incorrectness in the design end transverse cross section, or footprint, of a beam. In the case of an I-beam, such as I-beam 10, and in the event of fabrication-created deformation, or distortion, as illustrated in dashed lines in FIG. 2, suitable correction can be implemented, for example, by applying compressive clamping pressure to the "splayed" portions of flanges 10b, 10c (see arrows 17 the right sides thereof as pictured in FIG. 2) to bring the two flanges into proper parallel planarity, and into conditions with their nominal planes, $10b_1$, $10c_1$, at right angles to web plane $10a_1$. With this corrective action performed, and while proper transverse cross-sectional configuration is "held", the "corrected" beam end is fitted complementarily, snuggly and "capturedly" with the female-prepared side of a beam-end mounting component. This complementary fitment produces a weld-poised, stabilized positional relationship between the associated beam end and beam-end mounting component.

With a beam 10 so positioned with respect to component 16, one will observe that, effectively, the transverse cross section, or footprint, of the beam is captured and locked against distortion in a transverse sense. Also, with a beam end thus properly poised relative to a beam-end mounting component 16, pockets of space generally shown at 18 exist for the creation of a molten weld pool during intended welding of the beam end to the beam-end mounting component. The presence and utility of regions 18 in component 16 are more fully described in another previously filed and currently pending U.S. Patent Application, Ser. No. 10/699,759, filed Nov. 3, 2003 by Robert J. Simmons for "Beam End Weld Preparation", now U.S. Pat. No. 7,051,917 B2, granted May 30, 2006. While this weld-pool structure forms no part of the present invention, for background purposes in understanding what is shown in the figures in this application, the entire disclosure of that just-last-mentioned, prior-filed U.S. patent application is hereby incorporated herein by reference.

With a beam end thus weld-poised in the condition just described with respect to a beam-end mounting component 16, it is not possible that the transverse cross-section of the beam-end footprint will either (a) return to distortion, or (b) become newly transversely distorted, during welding attachment of that beam end to a beam-end mounting component.

FIGS. 6 and 7 illustrate schematically one way in which beam-end and beam-end mounting component weld attachment can be performed. Here, indicated fragmentarily and generally at 20 is jig structure, or beam-reception jig, for accomplishing this activity, including a frame 22 on which is mounted a spring-biased laterally shiftable biasing element 24. Element 24 is biased by a biasing spring 26 which tends to urge element 24 to the right in FIG. 6 relative to frame 22 as generally indicated by an arrow 27 in FIG. 6.

Carried for lateral reciprocal shifting on and with respect to element 24 is another shiftable element 28 (shown in dashed lines) which is urged by an appropriate biasing spring 30 generally in the direction of arrow 32 (see FIG. 6) relative to element 24.

With a beam end properly complementarily fitted (assembled into conjunction) with a beam-end mounting component 16, this assembly is brought into appropriate contact with the outwardly exposed portion of element 28 in jig 20, and biasing spring 30 creates a spring-biased attractive force which tends to hold the then associated beam-end mounting component tightly against shiftable element 24 in the jig. The exposed portion of element 28 in jig 20 is shaped with an appropriate male cleat, like previously mentioned cleat 12a, so as to accomplish and accommodate proper reception and complementary fitment of the female prepared outwardly facing side of a beam-end mounting component. Biasing spring 26 tends to urge shiftable element 24 against the assembly of the beam and beam-end mounting component to aid in stabilization.

Preferably, the jig is constructed so that it has a pair of spaced apart structural arrangements much like that schematically pictured in FIGS. 6 and 7, whereby opposite ends of an elongate beam, similarly prepared for weld attachment of beam-end mounting components, becomes seated in the jig generally as just described.

In any suitable manner, which may either be under robotic computer control, or performed manually, appropriate welding takes place along the upper and lower sides of the flanges of the beam, and along the opposite sides of the beam's web, thus to weld-secure the opposite ends of the associated beam with the complementarily fitted beam-end mounting components.

It should be appreciated that there are many ways in which such weld-attaching may be performed, and the schematically illustrated jig structure fragmentarily pictured herein and generally described, sets forth just one of such many attachment modalities. The precise construction of a jig, such as jig 20, forms no part of the present invention, and the details thereof, accordingly, have not been elaborated herein.

By practicing the present invention, and by implementing several, above-described, very simple and inexpensive steps, transverse cross section deformations found in conventionally fabricated beams are successfully and definitively addressed. They are addressed in a manner which readily enables the precision weld-attachment of beam-end mounting components that allow an associated beam to be employed in close-tolerance, precision building-frame construction. Practice of the invention which involves end footprint-"correcting" of a beam also makes possible and reliable, if desired, computer-controlled, automatic, robotic welding at the ends of beams.

Accordingly, while a preferred manner of practicing the present invention has been described and illustrated herein, it is appreciated that variations and modifications may be made without departing from the spirit of the invention, and all such variations and modifications are considered to be within the scope and spirit of the present invention.

I claim:

1. A method for correctness-stabilizing a distorted transverse cross section of a beam end of an elongate structural beam during weld attachment of the beam end to a beam-end mounting component having an attaching side intended to confront the beam end, said method comprising:
   configurationally correcting and capturing an end transverse footprint of such a beam with an external structure in the form of the beam-end mounting component to lock that footprint against subsequent configuration change, by
   providing a defined male attaching portion at the beam end,
   forming, in the beam-end mounting component's attaching side, at least a partial, matching-cross-section female reception structure which is adapted snuggly to receive the distorted transverse cross section of the beam end and its male attaching portion of the mentioned beam end,
   inserting the beam-end male attaching portion into the beam-end mounting component's female reception structure, assuring the presence, at the beam end, of a configurationally correct transverse cross section, to produce a weld-poised, captured condition between the beam end and the beam-end mounting component, and
   while holding that poised condition, producing a weld between the beam end and the beam-end mounting component.

2. The method of claim 1 which is styled for use especially with a beam having an I-beam transverse cross section including a central web, and a pair of spaced, substantially parallel planar flanges.

3. The method of claim 2, wherein said assuring includes applying corrective measures, as required, to establish correct angular relationships between the beam's web and flanges.

4. The method of claim 2, wherein said assuring includes creating an axially recessed region/receptor pocket in the beam's central web.

5. The method of claim 1, wherein the beam-end cross section is defined by web and flange structure, and said forming involves creating, in the attaching side of the beam-end mounting component, female flange-structure reception zones.

6. The method of claim 1 which is performed in a beam-reception jig structure utilizing longitudinal axial compression biasing during welding to assist in stabilizing the mentioned weld-poised condition.

7. The method of claim 6, wherein axial biasing compression is applied by a biasing element designed to engage the beam-end mounting component, and which further involves, during welding, creating a spring-biased attractive force between the beam-end mounting component and the biasing element.

8. A method for stabilizing, in correctness, a transverse cross section of an end of an elongate structural beam during weld attachment to that end of a beam-end mounting component, said method comprising:
   configurationally correcting and capturing an end transverse footprint of such a beam with an external structure to lock that footprint against subsequent configuration change, and while so capturing, weld-attaching that end transverse footprint to the mentioned beam-end mounting component.

9. The method of claim 8, wherein said capturing is performed by the mentioned beam-end mounting component.

10. A method associated with the attachment of a beam to a column utilizing a beam-end mounting component which comprises:
  configurationally correcting and capturing an end transverse footprint of such a beam with an external structure in the form of the beam-end mounting component to lock that footprint against subsequent configuration change, by
  pre-weld preparation of a beam end to create a design-correct transverse cross section with a male attaching portion,
  pre-weld preparation of a beam-end mounting component to form a female attaching portion, complementary to the male attaching portion of the beam end,
  pre-weld assembly into conjunction of the beam end and beam-end mounting component to create a weld-poised condition, with the beam end and beam-end mounting component thereby stabilized by the complementary fit of the male-to-female conjunction of the beam end and beam-end mounting component, and
  subsequent welding of the beam end and beam-end mounting component.

11. A method for correctness-stabilizing a distorted transverse cross section of a beam end of an elongate structural beam during weld attachment of the beam end to a beam-end mounting component having an attaching side intended to confront the beam end, with the mounting component being intended to act as an intermediary in the attaching of the beam end to a column in a structural building frame, said method comprising:
  configurationally correcting and capturing an end transverse footprint of such a beam with an external structure in the form of the beam-end mounting component to lock that footprint against subsequent configuration change, by
  providing a defined male attaching portion at the beam end,
  forming, in the beam-end mounting component's attaching side, at least a partial, matching-cross-section female reception structure which is adapted snuggly to receive, only in a forced, undistorted configurational condition, the otherwise distorted transverse cross section of the beam end and its male attaching portion of the mentioned beam end,
  applying pressure as required to force the beam-end geometry into an undistorted configurational condition,
  inserting the beam-end male attaching portion at the forced, configurationally undistorted beam end into the beam-end mounting component's female reception structure, and thereby assuring the stabilized presence, at the beam end, of a configurationally correct, undistorted transverse cross section, thus to produce a weld-poised, captured condition between the undistorted beam end and the beam-end mounting component, and
  while holding that poised condition, producing a weld between the beam end and the beam-end mounting component.

* * * * *